(12) United States Patent
Mysore Siddu et al.

(10) Patent No.: US 11,138,778 B2
(45) Date of Patent: Oct. 5, 2021

(54) OBSCURING FACIAL FEATURES OF A SUBJECT IN AN IMAGE

(71) Applicant: KONINKLIJKE PHILIPS N.V., Eindhoven (NL)

(72) Inventors: Dinesh Mysore Siddu, Bangalore (IN); Krishnamoorthy Palanisamy, Bangalore (IN); Sudipta Chaudhury, Bangalore (IN); Anshul Jain, Bangalore (IN); Pravin Pawar, Bangalore (IN); Nagaraju Bussa, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/619,111

(22) PCT Filed: Jun. 28, 2018

(86) PCT No.: PCT/EP2018/067508
§ 371 (c)(1),
(2) Date: Dec. 4, 2019

(87) PCT Pub. No.: WO2019/002521
PCT Pub. Date: Jan. 3, 2019

(65) Prior Publication Data
US 2020/0118317 A1    Apr. 16, 2020

(30) Foreign Application Priority Data
Jun. 29, 2017  (EP) .................................... 17178705

(51) Int. Cl.
*G06T 11/60* (2006.01)
*G06T 7/73* (2017.01)
(Continued)

(52) U.S. Cl.
CPC .......... *G06T 11/60* (2013.01); *G06K 9/00248* (2013.01); *G06K 9/00268* (2013.01);
(Continued)

(58) Field of Classification Search
CPC ....... G06T 11/60; G06T 7/73; G06T 2200/24; G06T 2207/30201; G06K 9/00248; G06K 9/00268; G06K 9/3266; G06K 9/00221
See application file for complete search history.

(56) References Cited

U.S. PATENT DOCUMENTS 9,292,734 B2 *  3/2016  Zhu ........................... G06T 7/75
2002/0188187 A1  12/2002  Jordan
(Continued)

OTHER PUBLICATIONS

International Search Report and Written Opinion dated Nov. 27, 2018 for International Application No. PCT/EP2018/067508 Filed June 28, 2018.
(Continued)

*Primary Examiner* — Phuoc Tran

(57) ABSTRACT

There is provided a computer-implemented method (200) for obscuring one or more facial features of a subject in an image. A head of the subject is detected in the image (202) and a location of one or more facial features of the subject is identified in the image (204). A region of the image to modify is determined based on the location of the one or more facial features (206). The determined region comprises a part of the head on which the one or more facial features are located. The image within the determined region is modified to obscure the one or more facial features (208).

20 Claims, 8 Drawing Sheets

(51) Int. Cl.
*G06K 9/00* (2006.01)
*G06K 9/32* (2006.01)

(52) U.S. Cl.
CPC .............. *G06K 9/3266* (2013.01); *G06T 7/73* (2017.01); *G06T 2200/24* (2013.01); *G06T 2207/30201* (2013.01)

(56) References Cited

U.S. PATENT DOCUMENTS

| | | | |
|---|---|---|---|
| 2005/0111762 A1 | 5/2005 | Mathew | |
| 2006/0124949 A1 | 6/2006 | Park | |
| 2009/0262987 A1* | 10/2009 | Ioffe | G06T 5/005 382/118 |
| 2010/0266207 A1* | 10/2010 | Zhang | H04N 5/262 382/195 |
| 2013/0182007 A1 | 7/2013 | Syeda-Mahmood | |
| 2014/0247272 A1* | 9/2014 | Sako | G06Q 50/01 345/589 |
| 2016/0019415 A1 | 1/2016 | Ra | |
| 2016/0124949 A1 | 5/2016 | Chau | |
| 2016/0132719 A1 | 5/2016 | Fifthian | |
| 2016/0203264 A1 | 7/2016 | Danner | |

OTHER PUBLICATIONS

Nakeisha Schimke, et al: "Preserving Privacy in Structural Neuroimages", Jul. 11, 2011.
Nakeisha Schimke, et al: "Quickshear Defacing for Neuroimages" Aug. 2, 2011.
Bischoff-Grethe et al: "A technique for the deidentification of structural brain MR images", Human Brain Mapping, vol. 28, No, 9, Sep. 1, 2007.
Milchenk0 et al: "Obscuring Surface Anatomy in Volumetric Imaging Data", Neuroinformatics, Springer-Verlag, New York, vol. 11, No. 1, Sep. 12, 2012.
Freymann, et al: "Image Data Sharing for Biomedical Research—Meeting HIPAA Requirements for De-identification" J Digit Imaging (2012) 25:14-24.
David Clunie, "De-identification Revisited DICOM Supplement 142", DICOM International Conference & Seminar, Oct. 9-11, 2010 Rio de Janeiro, Brazil.
Digital Imaging and Communications in Medicine (DICOM), National Electrical Manufacturers Association, 2011. Available online: http://dicom.nema.org/Dicom/2011/11_01pu.pdf Last accessed date: Nov. 7, 2016.
List of 18 HIPAA identifiers http://www.atlanta.va.gov/Docs/HIPAA_Identifiers.pdf Last accessed date: Nov. 7, 2016.
Guidance Regarding Methods for De-identification of PHI in Accordance with the HIPAA Privacy Rule—http://www.hhs.gov/hipaa/for-professionals/privacy/special-topics/de-identification/ Last accessed date: Nov. 7, 2016.

* cited by examiner

OBSCURING FACIAL FEATURES OF A SUBJECT IN AN IMAGE

CROSS REFERENCE TO RELATED APPLICATIONS

This application is the U.S. National Phase application under 35 U.S.C. § 371 of International Application No. PCT/EP2018/067508 filed Jun. 28, 2018, published as WO 2019/002521 on Jan. 3, 2019, which claims the benefit of European Patent Application Number 17178705.4 filed Jun. 29, 2017. These applications are hereby incorporated by reference herein.

TECHNICAL FIELD OF THE INVENTION

This disclosure relates to the field of image processing and, in particular, to a method and apparatus for obscuring facial features of a subject in an image.

BACKGROUND TO THE INVENTION

The sharing of medical imaging data across a research community is critical for cross disciplinary research and assuring scientific validity. Although the sharing of data is encouraged, it is not widespread as there are potential privacy violations associated with distributing medical data. Regulations such as the Health Insurance Portability and Accountability Act privacy (HIPAA) specify strict guidelines with respect to the de-identification of Protected Health Information (PHI) from medical data that is to be shared and specify the components of private health information that are to be protected. However, there are no commonly accepted methods to de-identify clinical data objects such as images. As such, many institutions take conservative risk-averse positions on data sharing.

The Digital Imaging and Communication in Medicine (DICOM) standard has been commonly used for storing, viewing and transmitting information in medical imaging. In imaging trials where images are coded according to the DICOM standard, the complexity of the data objects and the flexibility of the DICOM standard have made it especially difficult to meet privacy protection objectives. A DICOM file contains two main parts: a header with a large variety of data elements (i.e. data fields) and a viewable image that holds all of the pixel data. Pixel data can be compressed using a variety of standards, including JPEG, Lossless JPEG, JPEG 2000, and run-length encoding (RLE). An image may contain embedded (burnt-in) text, such as medical annotations or patient information. An image may also contain secondary captures, screen shots (e.g. analysis result screens) or scanned documents (requests or reports), which may reveal personal information about a patient. In addition, a patient may be inferred by reconstructing images in a DICOM volume into a three-dimensional image (for example, of the face of the subject).

The field of header tag de-identification is a well matured field and many third party tools provide support for anonymization of DICOM tags. However, most of these tools do not have capabilities to de-identify PHI text information that is embedded in DICOM images, such as embedded text (e.g. text that is part of the pixel data, such as text that forms part of a screen shot of a display of an apparatus) and facial features that may be useable to identify the subject. Techniques exist to perform facial recognition from surface or volume rendered computed tomography (CT) and magnetic resonance (MR) images and are able to achieve moderate success. Therefore, facial features need to be obscured in DICOM images before they can be distributed for research, or other purposes in order to protect the identity of the subject.

US 2006/0124949 discloses a defacing algorithm where a combination of thresholding and distance from air, and distance from a well-known reference point in the patient's body is used to identify voxels representing skin tissue and defacing is accomplished by averaging a localized group of voxels' intensities and applying to the same region or by using a series of connected straight lines to represent skin tissue instead of forming a smooth contour representing skin tissue. However, although patient identifiable information can be protected by employing this defacing algorithm, the algorithm only preserves clinical data in tissue other than skin and thus it is not possible to clinically analyse any parts of the image that comprise skin.

There is thus a need for an improved method and apparatus for obscuring facial features of a subject and embedded text in an image.

SUMMARY OF THE INVENTION

As noted above, protected health information (PHI) such as facial features and/or embedded text in medical images needs to be removed before the image can be shared for research, archiving, or other purposes. Although current approaches effectively remove patient identifiable information from DICOM headers, effective methods to obscure facial features and/or embedded text are less advanced. In particular, it is not possible to protect patient identifiable information without the risk of losing information that may be useful or even critical for performing a reliable analysis of images. It is therefore desirable to provide an improved apparatus for obscuring facial features of a subject in an image, which overcomes the existing problems. Therefore, according to a first aspect, there is provided a computer-implemented method for obscuring one or more facial features of a subject in an image. The method comprises detecting a head of the subject in the image, identifying a location of one or more facial features of the subject in the image and determining a region of the image to modify based on the location of the one or more facial features. The determined region comprises a part of the head on which the one or more facial features are located. The method further comprises modifying the image within the determined region to obscure the one or more facial features.

In some embodiments, identifying may comprise detecting a skin surface of the head of the subject in the image and identifying a location of the one or more facial features on the detected skin surface of the head of the subject in the image. In some embodiments, detecting the skin surface of the head of the subject in the image may comprise determining a convex hull for the head of the subject in the image; for one or more points on a surface of the convex hull, tracing a path inwardly towards the centre of the head of the subject in the image; and detecting the skin surface of the head of the subject where a component of the image having a value greater than a background level for the image is detected.

In some embodiments, the location of two or more facial features may be identified and the region of the image to modify may be determined based on a distance between the locations of at least two facial features multiplied by a value of a predefined ratio. In some embodiments, the predefined ratio may define a relationship of the distance between the locations of the at least two facial features to a distance between the locations of the at least two facial features and the locations of the at least one or more other features.

In some embodiments, the method may further comprise adjusting the region of the image to modify based on a tilt of the head of the subject in the image.

In some embodiments, the image may be modified by outwardly extending a plurality of protrusions from the part of the head that is within the determined region of the image to obscure the one or more facial features. In some embodiments, the image may be further modified by setting one or more of the outwardly extending protrusions to different grayscale values.

In some embodiments, the method may further comprise identifying one or more candidate regions of the image for text relating to personal information of the subject, determining at least one feature of the image in the one or more identified candidate regions of the image, selecting from the candidate regions the regions that comprise text relating to personal information of the subject based on the at least one determined feature of the image in the one or more identified candidate regions of the image, and modifying the image within the selected regions to obscure the text relating to personal information of the subject.

In some embodiments, the at least one feature may comprise any one or more of a convex hull for a set of components in the one or more identified candidate regions of the image, a ratio of the number of components in the one or more identified candidate regions comprising text to the number of components in the entire image, a geometric eccentricity of the image in the one or more identified candidate regions, a solidity of the components in the image in the one or more identified candidate regions, and an intensity of the image in the one or more identified candidate regions.

In some embodiments, identifying one or more candidate regions may comprise detecting one or more regions in the image comprising connected components with the same value and identifying the regions having a size greater than a predefined size as background regions and the remaining regions as candidate regions for text relating to personal information of the subject.

In some embodiments, selecting may comprise comparing the at least one determined feature to one or more stored features that are indicative of a region comprising text relating to personal information and selecting, from the candidate regions, the regions that comprise text relating to personal information of the subject based on the comparison.

In some embodiments, the method may comprise performing text recognition within the selected regions to identify a location of the text relating to personal information of the subject within the selected regions. In this embodiment, modifying the image may comprise modifying the image within the selected regions at the identified location to obscure the text relating to personal information of the subject.

According to a second aspect, there is provided a computer program product comprising a computer readable medium, the computer readable medium having computer readable code embodied therein, the computer readable code being configured such that, on execution by a suitable computer or processor, the computer or processor is caused to perform the method as described above.

According to a third aspect, there is provided an apparatus comprising a processor. The processor is configured to perform the method as described above.

According to the aspects and embodiments described above, the limitations of existing techniques are addressed. In particular, according to the above-described aspects and embodiments, an image is modified within a region that is set based on the location of the one or more facial features, wherein the region comprises a part of the head on which the one or more facial features are located. In this way, the identity of a subject is protected whilst other parts of the subject (for example, including the unobscured parts of the head of the subject, or the inside of the head) remain visible and can thus be used for research, archiving, clinical analysis, or other purposes.

There is thus provided an improved method and apparatus for obscuring facial features of a subject in an image, which overcomes the existing problems.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

As noted above, there is provided an improved method and apparatus for obscuring facial features of a subject in an image, which overcomes the existing problems.

Figure 1:
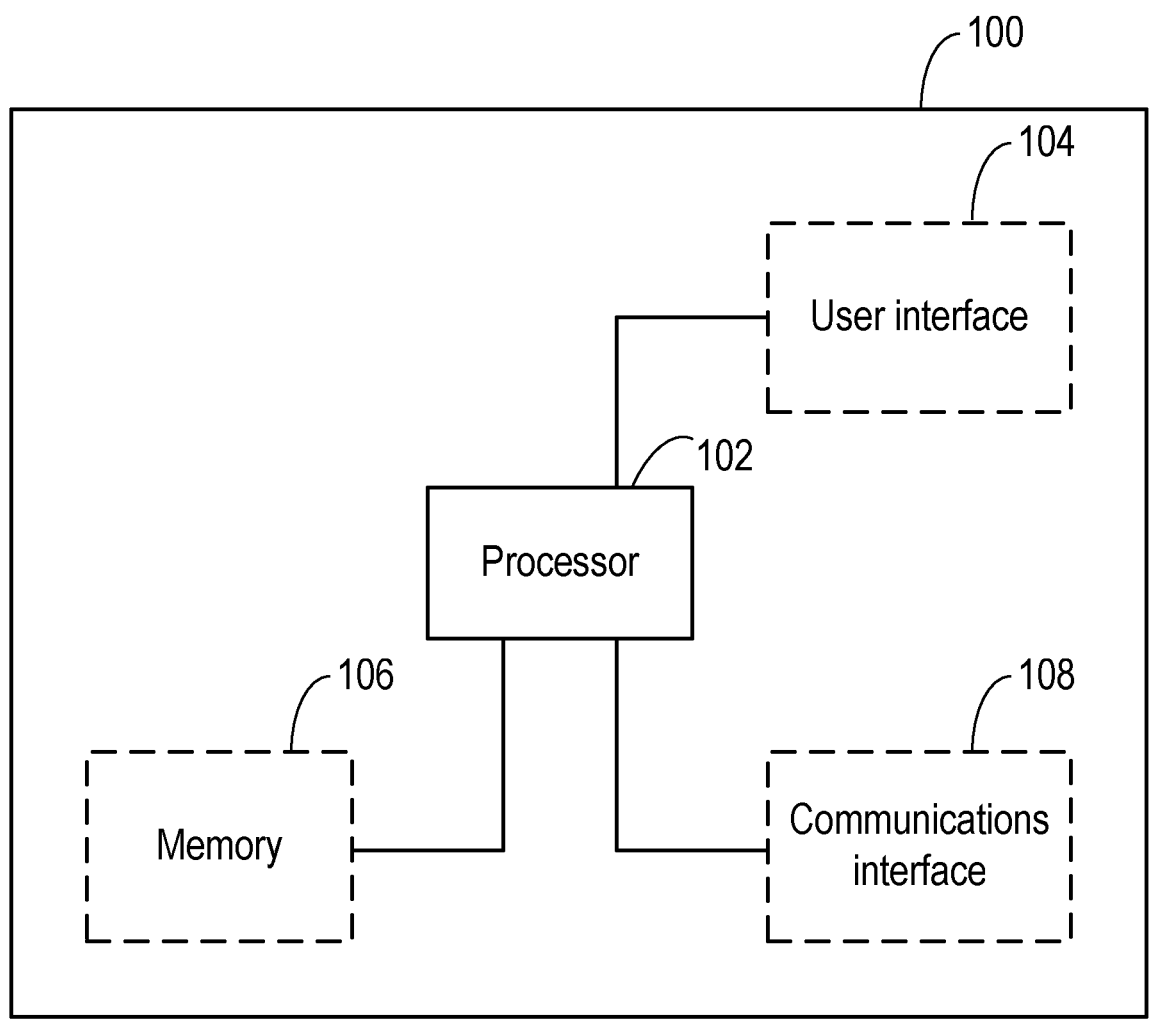
FIG. 1 is a block diagram of an apparatus for obscuring facial features of a subject in an image according to an embodiment.

FIG. 1 shows a block diagram of an apparatus 100 according to an embodiment that can be used for obscuring one or more facial features of a subject in an image. In any of the embodiments disclosed herein, the image can be a two-dimensional image, a three-dimensional image, or any other dimensional image. The image comprises a plurality (or set) of components. In embodiments where the image is a two-dimensional image, the components are pixels. In embodiments where the image is a three-dimensional image, the components are voxels.

The image can, for example, be a medical image. Examples of a medical image include, but are not limited to, a computed tomography (CT) image (for example, from a CT scan), a single-photon emission computed tomography (SPECT) image (for example, from a SPECT scan), a positron emission tomography (PET) image (for example, from a PET scan), a magnetic resonance (MR) image (for example, from a magnetic resonance imaging MRI scan), an ultrasound (US) image (for example, from an ultrasound scan), or any other image in which facial features of a subject may be present. In some embodiments, the image may be in a Digital Imaging and Communication in Medicine (DICOM) format, a Flexible Image Transport System (FITS) data format, a Neuroimaging Informatics Technology Initiative (NIfTI) data format, or any other format. Although examples have been provided for the type of image, a person skilled in the art will appreciate that the teachings provided herein may equally be applied to any other type of image in which facial features of a subject may be present.

With reference to FIG. 1, the apparatus 100 comprises a processor 102 that controls the operation of the apparatus 100 and that can implement the method described herein. The processor 102 can comprise one or more processors, processing units, multi-core processors or modules that are configured or programmed to control the apparatus 100 in the manner described herein. In particular implementations, the processor 102 can comprise a plurality of software and/or hardware modules that are each configured to perform, or are for performing, individual or multiple steps of the method described herein.

Briefly, the processor 102 of the apparatus 100 is configured to detect a head of a subject in an image and identify a location of one or more facial features of the subject in the image. The processor 102 is also configured to determine a region of the image to modify based on the location of the one or more facial features. The determined region comprises a part of the head on which the one or more facial features are located. The processor 102 is also configured to modify the image within the determined region to obscure the one or more facial features.

This has the technical effect of obscuring the facial features such that the identity of the subject cannot be ascertained from the image such as by using facial recognition techniques, whilst other parts of the subject (or, in particular, the unobscured parts of the head of the subject) remain visible. In this way, the image is anonymised such that it can be distributed for research, archiving, clinical analysis, or other purposes, without the identity of the individual being made available but with other information remaining available for use.

In some embodiments, as illustrated in FIG. 1, the apparatus 100 may also comprise at least one user interface 104. Alternatively or in addition, at least one user interface 104 may be external to (i.e. separate to or remote from) the apparatus 100. For example, at least one user interface 104 may be part of another device. A user interface 104 may be for use in providing a user of the apparatus 100 (for example, a healthcare provider, a healthcare specialist, a care giver, a subject, or any other user) with information resulting from the method according to embodiments herein. The processor 102 may be configured to control one or more user interfaces 104 to provide information resulting from the method according to embodiments herein. For example, the processor 102 may be configured to control one or more user interfaces 104 to render (or output or display) the modified image with the one or more obscured facial features. Alternatively or in addition, a user interface 104 may be configured to receive a user input. In other words, a user interface 104 may allow a user of the apparatus 100 to manually enter instructions, data, or information. The processor 102 may be configured to acquire the user input from one or more user interfaces 104.

A user interface 104 may be any user interface that enables rendering (or output or display) of information, data or signals to a user of the apparatus 100. Alternatively or in addition, a user interface 104 may be any user interface that enables a user of the apparatus 100 to provide a user input, interact with and/or control the apparatus 100. For example, the user interface 104 may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, as illustrated in FIG. 1, the apparatus 100 may also comprise a memory 106 configured to store program code that can be executed by the processor 102 to perform the method described herein. Alternatively or in addition, one or more memories 106 may be external to (i.e. separate to or remote from) the apparatus 100. For example, one or more memories 106 may be part of another device. A memory 106 can be used to store images, information, data, signals and measurements acquired or made by the processor 102 of the apparatus 100 or from any interfaces, memories or devices that are external to the apparatus 100. For example, a memory 106 may be used to store the modified image with the one or more obscured facial features. The processor 102 may be configured to control a memory 106 to store the modified image with the one or more obscured facial features.

In some embodiments, as illustrated in FIG. 1, the apparatus 100 may also comprise a communications interface (or circuitry) 108 for enabling the apparatus 100 to communicate with any interfaces, memories and devices that are internal or external to the apparatus 100. The communications interface 108 may communicate with any interfaces, memories and devices wirelessly or via a wired connection. For example, in an embodiment where one or more user interfaces 104 are external to the apparatus 100, the communications interface 108 may communicate with the one or more external user interfaces 104 wirelessly or via a wired connection. Similarly, in an embodiment where one or more memories 106 are external to the apparatus 100, the communications interface 108 may communicate with the one or more external memories 106 wirelessly or via a wired connection.

It will be appreciated that FIG. 1 only shows the components required to illustrate this aspect of the disclosure, and in a practical implementation the apparatus 100 may comprise additional components to those shown. For example, the apparatus 100 may comprise a battery or other power supply for powering the apparatus 100 or means for connecting the apparatus 100 to a mains power supply.

Figure 2:
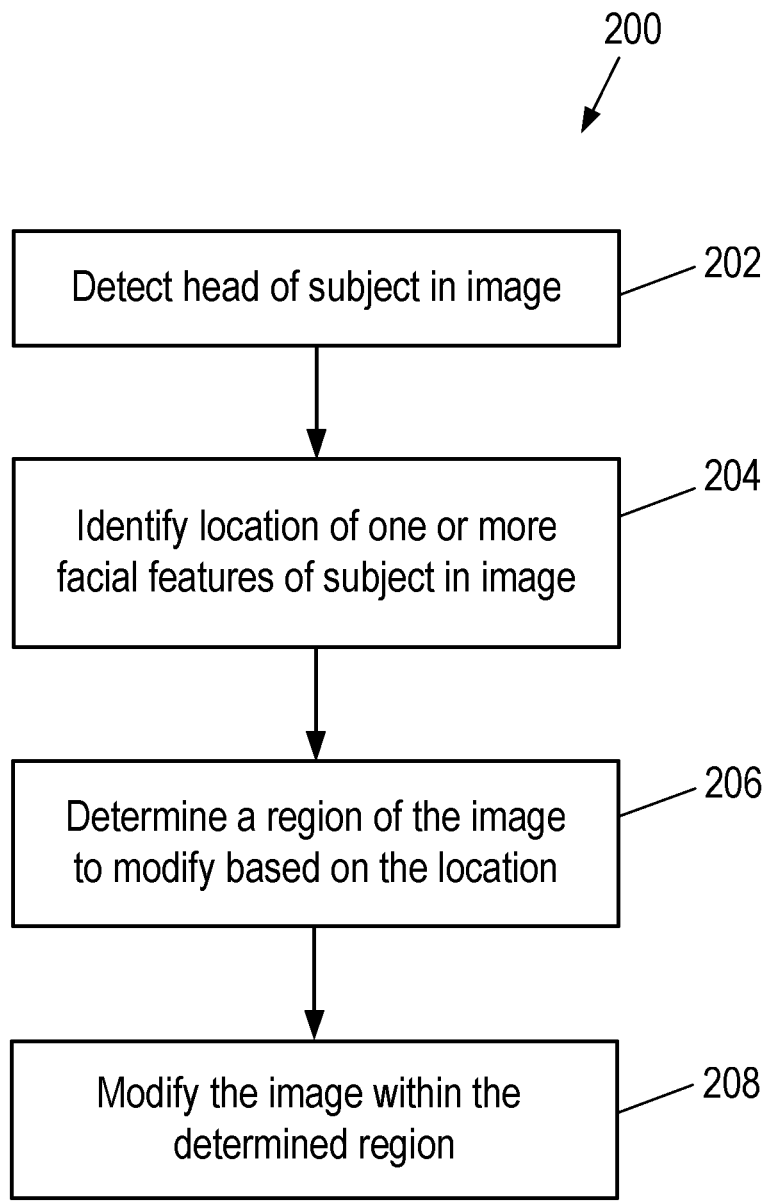
FIG. 2 illustrates a method for obscuring one or more facial features of a subject in an image according to an embodiment.

FIG. 2 illustrates a computer-implemented method 200 for obscuring one or more facial features of a subject in an image according to an embodiment. The illustrated method 200 can generally be performed by or under the control of the processor 102 of the apparatus 100. As mentioned earlier, the image may be a two-dimensional comprising a plurality of pixels (or pixel data), a three-dimensional image comprising a plurality of voxels (or voxel data), or any other type of image and any format of image.

Briefly, with reference to FIG. 2, the method comprises detecting a head of the subject in the image (at block 202 of FIG. 2), identifying a location of one or more facial features of the subject in the image (at block 204 of FIG. 2) and determining a region of the image to modify based on the location of the one or more facial features (at block 206 of FIG. 2). The determined region comprises a part of the head on which the one or more facial features are located. The method also comprises modifying the image within the determined region to obscure the one or more facial features (at block 208 of FIG. 2).

In more detail, at block 202 of FIG. 2, the head (and also, optionally, the neck) of the subject is detected in the image. A person skilled in the art will be aware of various techniques by which a head of a subject can be detected in an image. However, as an example, an atlas-based registration technique may be used. Generally, atlas-based techniques use a training set of manually labelled images (e.g. images comprising heads where the head is labelled by a professional) to train a learning algorithm to recognise a head in a previously unseen image containing a head. Although an example has been provided for a head detection method, it will be understood that any other method suitable for detected a head in an image may be used and a person skilled in the art will be aware of such methods.

At block 204 of FIG. 2, a location of one or more facial features (or facial landmarks) of the subject is identified in the image. In some embodiments, the location of two or more facial features of the subject may be identified in the image. The facial features (or facial landmarks) may comprise any one or more of (i.e. any single one or any combination of) an eye, a pair of eyes, a nose, a mouth, an ear, a pair of ears, or any other facial features, or combination of facial features.

In some embodiments, identifying one or more facial features of the subject may comprise detecting a skin surface of the head of the subject in the image and then identifying the location of the one or more facial features on the detected skin surface of the head of the subject in the image. In some embodiments, a skin surface of the head of the subject in the image may be detected by determining (or computing or forming) a convex hull for the head of the subject in the image. A convex hull may also be referred to as the convex envelope. The mathematical concept of a convex hull will be familiar to a person skilled in the art and the person skilled in the art will be aware of various algorithms that can be used to determine (or compute or form) a convex hull for a geometric object, which in this case is the head of the subject in the image.

However, briefly, a convex hull for a set of points is the smallest polygon that can be defined such that for any two points in the set, a line can be drawn between the two points which lies completely within the polygon. Although an example has been provided for determining the convex hull for the head of the subject in the image, it will be understood that any other method suitable for determining the convex hull for the head of the subject in the image can be used and a person skilled in the art will be aware of such methods.

In some embodiments, the convex hull for the head of the subject in the image may be determined (or computed or formed) by assuming that the components of the image (namely, the pixels of a two-dimensional image or the voxels of a three-dimensional image) with values above a predefined threshold correspond to the head of the subject in the image and components of the image with values below the predefined threshold correspond to the background in the image. The convex hull for the head of the subject in the image can thus be determined (or computed or formed) as the convex hull for the components with values above the predefined threshold. The predefined threshold may also be referred to as a minimum threshold.

It will be understood that an appropriate value for the predefined threshold will depend on the type of image and the range of component (for example, pixel or voxel) values in the image. In some embodiments, an appropriate value for the predefined threshold may be set through trial and error. In some embodiments, a calibration step may be performed to set the predefined threshold. For example, a user may manually highlight or select an area of the image (in a two-dimensional image embodiment) or volume of the image (in a three-dimensional image embodiment) that represents a background region. The values of the components that are highlighted or selected as representing the background in the image may then be used to set an appropriate level for the predefined threshold. In some embodiments, the background in the image may be detected automatically. For example, particular parts (such as one or more edge portions) of the image may be assumed to represent the background in the image.

As described above, a convex hull for the head of the subject may be determined (or computed or formed). The convex hull for the head of the subject in the image may be a polygon. The polygon may cover (and, for example, surround or completely enclose) the head of the subject. In some embodiments, the skin surface of the head of the subject in the image may then be detected by ray casting from one or more points on a surface (or perimeter) of the convex hull inwardly towards the centre of the head, until the skin surface is detected. In other words, for one or more points on the convex hull, a ray (or path) is traced (or cast or projected) inwardly towards the centre of the head. The centre of the head may be identified by determining the centroid of the convex hull.

The skin surface of the head of the subject in the image is then detected where a component comprising skin (i.e. a skin component) is detected in the image. For example, for one or more points on the convex hull, a ray (or path) is traced inwardly towards the centre of the head, such as towards the centroid of the convex hull. The skin surface of the head of the subject in the image is then detected where a pixel comprising skin (i.e. a skin pixel) is detected in a two-dimensional image or where a voxel comprising skin (i.e. a skin voxel) is detected in a three-dimensional image. The skin components (e.g. the skin pixels or the skin voxels) are those components that have a value greater than a background level for the image. By ray casting from the surface of the convex hull in the manner described here, the surface of the skin can be determined (for example, around the full circumference of the head). The concept of ray casting will be familiar to a person skilled in the art and the person skilled in the art will be aware of various algorithms that can be used for ray casting from the surface of the convex hull toward the centre of the head.

Thus, in the manner described above, a skin surface of the head of the subject in the image can be detected. As mentioned earlier, the location of the one or more facial features on the detected skin surface of the head of the subject may then be identified in the image. In some embodiments, the location of the one or more facial features on the detected skin surface of the head of the subject may be identified using landmark detection. In an example, the left and right eye locations are identified based on landmark detection. It will be understood that any method suitable for identifying the location of the one or more facial features in the image can be used and a person skilled in the art will be aware of various techniques by which the location of the one or more facial features can be identified in the image.

Generally, once the location of a facial feature is determined at block 204, the location and type of feature can be used as to determine the orientation of the head. For example, if the location of the nose is determined at block 204, then the location of the nose can be used to determine which part of the skin surface (or the convex hull) corresponds to the front of the head. Similarly, if the locations of the eyes are determined at block 204, then the locations of the eyes can be used to determine which side of the skin surface (or the convex hull) corresponds to the face of the subject. Thus, in some embodiments, the orientation of the head may also be determined, based on the location and type of facial features that are identified.

At block 206 of FIG. 2, a region of the image to modify is determined, based on the location of the one or more facial features. In other words, a mask boundary is set (or defined) based on the location of the one or more facial features. The determined region of the image to modify comprises a part of the head on which the one or more facial features are located. In some embodiments, the determined region to be modified comprises a region (such as a volume or surface) encompassing part of the face that contains identifiable facial features. In some embodiments, for example, the determined region to be modified may encompass one or more of (i.e. one or any combination of) an eye, a pair of eyes, an ear, a pair of ears, a nose, a mouth, or any other facial features, or combination of facial features. In some embodiments, the determined region to be modified may, for example, comprise a region encompassing the eyes, the nose and the mouth.

In some embodiments, the determined location of the one or more features can be combined with certain proportionalities of the face of the subject in order to determine the region of the image to modify, which may be a region that completely covers all identifiable facial features. For example, in embodiments where the locations of two or more facial features of the subject are identified in the image, the region to be modified may be set based on a distance between the locations of at least two facial features multiplied by a value of a predefined ratio. The predefined ratio may be referred to as a golden ratio. The golden ratio may, for example, have a value of 1.6 (or, more specifically, 1.618). The predefined (or golden) ratio defines a relationship of the distance between the locations of the at least two facial features to a distance between that at least two facial features and one or more other features. Thus, in some embodiments, the distance between the locations of the at least two facial features may be determined at block 206 of FIG. 2. The distance between the locations of the at least two facial features provides an indication of the size (or scale) of the head of the subject in the image.

An appropriately sized region of the image to modify can be determined from the distance between the locations of the at least two facial features and the predefined ratio since the distance between the locations of the at least two facial features and the predefined ratio can be used to determined the distance between the locations of the at least two facial features and the location of one or more other features. For example, in some embodiments, the distance between the locations of the eyes of the subject may be determined at block 206. A region to be modified can then be determined based on the distance between the locations of the eyes and the predefined ratio since the predefined ratio defines the relationship of the distance between the eyes to the distance between the eyes and the nose. In this way, a region to be modified can be determined that encompasses both the nose and the eyes, without having to determine the location of the nose.

The predefined (or golden) ratio thus defines the relative proportions of different features of the face. For example, in some embodiments, the distance between the eyes and mouth for a female subject may be assumed to be approximately 36 percent of the length of the face of the female subject. Similarly, the distance between the eyes for a female subject may be assumed to be approximately 46 percent of the width of the face of the female subject. Therefore, by determining the distance between at least two facial features, the predefined (or golden) ratio can be used to determine a region of the image to modify.

In some embodiments, determining a region of the image to modify at block 206 of FIG. 2 can further comprise adjusting the region to be modified, based on a tilt of the face of the subject. In some embodiments, the region to be modified is adjusted by assuming that the face is tilted between a predefined maximum tilt and a predefined minimum tilt. For example, in some embodiments, it is assumed that the face is tilted by +/−10 degrees from the vertical. The method may therefore comprise obscuring a volume of the image, the volume corresponding to a volume that contains all possible locations of the surface of the face, between the maximum tilt and the minimum tilt. For example, in some embodiments, a volume can be extracted from the location and separation of the eyes, the predefined (or golden) ratio and the assumed range of tilts. By adjusting the region of the image to modify in this way to take into account a possible tilt of the face of the subject, it is ensured that the lower lip and chin are obscured in the image. It will be understood that the ranges indicated here for the tilt of the face of the subject are merely exemplary and that any other suitable range of tilts may be assumed.

Thus, in the manner described above, a region of the image to modify is determined at block 206 of FIG. 2. Then, at block 208 of FIG. 2, the image is modified within the determined region to obscure the one or more facial features. Thus, the image is modified within a set modification boundary. In this way, the identifiable features of the subject in the image are obscured, so as to anonymise the image and protect the privacy of the subject, whilst other parts of the image remain unobscured. The method described with reference to FIG. 2 can thus be implemented to de-identify or mask face information.

In some embodiments, the image may be modified by outwardly extending (or growing) a plurality of protrusions (for example, rays or stalactite structures) from the part of the head of the subject that is within the determined region, in order to obscure the one or more facial features. For example, the plurality of protrusions may be extended (or grown) from the face surface components, which are pixels in a two-dimensional image or voxels in a three-dimensional image. In some embodiments, the protrusions may be extended (or grown) by modifying the components in the image (i.e. the pixels in a two-dimensional image or voxels in a three-dimensional image) on the part of the head of the subject that is within the determined region with random noise values. This forms a noisy face layer, which acts as a mask to de-identify or mask face information in the image. By extending the plurality of protrusions outwardly, identifiable facial features (or those features that may identify the subject) on the head of the subject are obscured, whilst non-identifiable features (or those features that fail to identify the subject) on the head of the subject are not obscured.

This ensures that the maximum amount of data is preserved, whilst also ensuring that the identifiable features on the surface of the face of the subject are fully obscured.

According to some embodiments, the image can be further modified by setting one or more of the outwardly extending protrusions to different grayscale values. In this way any indication of the underlying skin tone or colouration is removed from the image.

Figure 3:
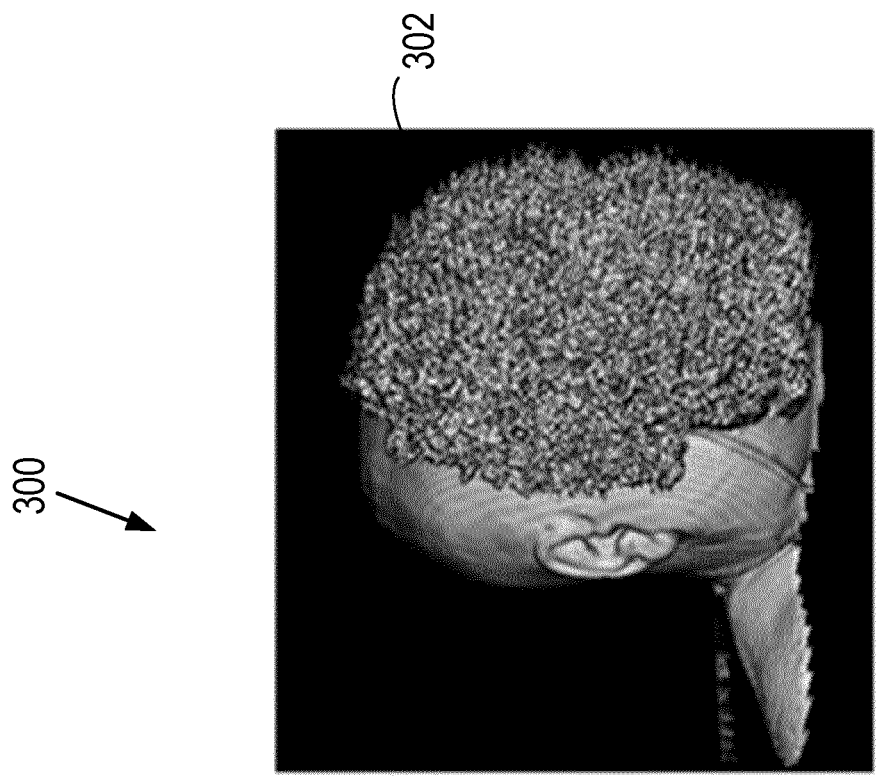
FIG. 3 illustrates an image modified according to an embodiment.
Figure 3:
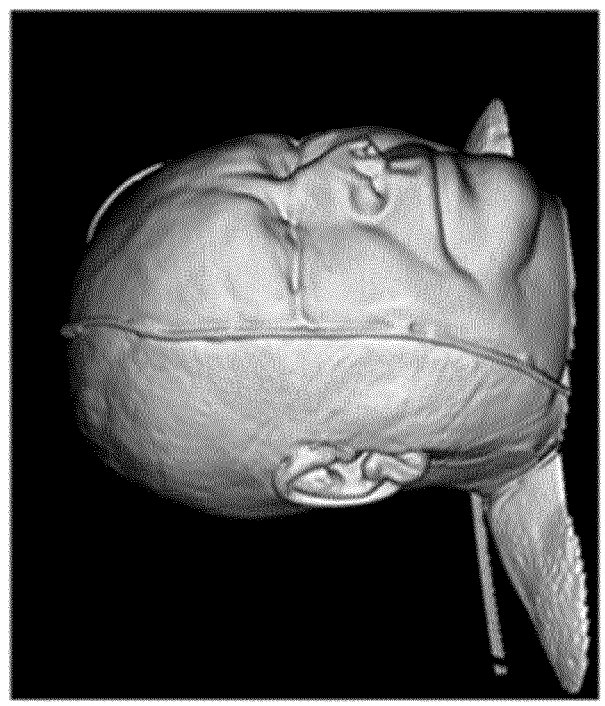

FIG. 3 illustrates an example of an image 300 modified in the manner described above according to an embodiment. As shown in FIG. 3, the image 300 comprises facial features that may be used to identify the person. Thus, the image is modified according to the method described herein by outwardly extending a plurality of protrusions 302 from the part of the head of the subject that is within the determined region in order to obscure the one or more facial features. In this way, the facial features are obscured and the resulting image can be distributed for research, archiving or other purposes, without the identity of the subject being derivable from the image 300.

Figure 4:
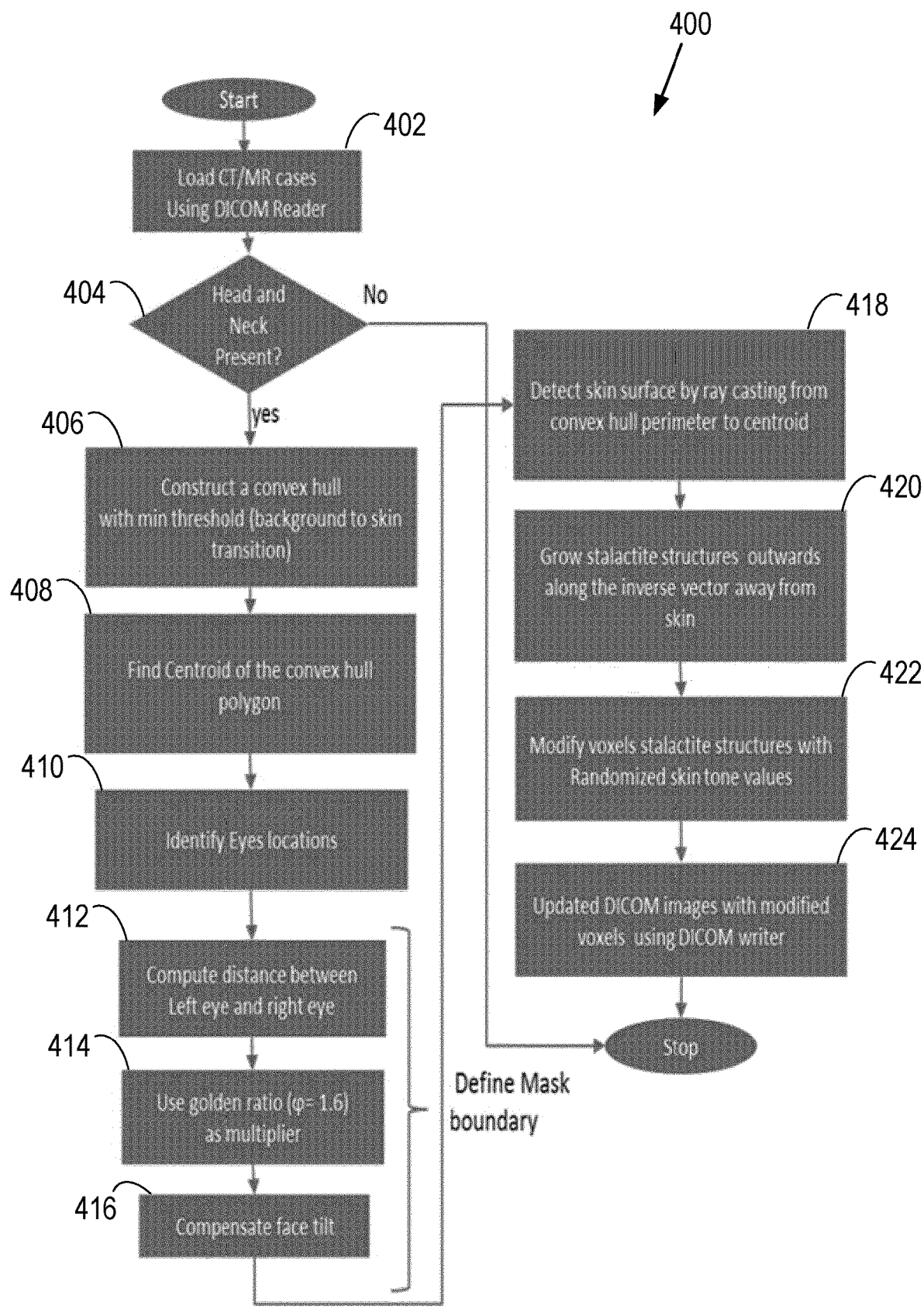
FIG. 4 illustrates a method for obscuring one or more facial features of a subject in an image according to an example embodiment.

FIG. 4 illustrates a computer-implemented method 400 for obscuring one or more facial features of a subject in an image according to an example embodiment. The illustrated method 400 can generally be performed by or under the control of the processor 102 of the apparatus 100.

At block 402 of FIG. 4, the image is loaded into the apparatus 100. In embodiments where the image is in a DICOM format, the image can be loaded using a DICOM reader. A person skilled in the art will be aware of appropriate DICOM readers.

At block 404 of FIG. 4, the image is analysed to detect a head (and, in this example embodiment, also a neck) of a subject in the image. In other words, the method described earlier with respect to block 202 of FIG. 2 is performed, which will not be repeated here, but it will be understood that the head (and neck) of the subject can be detected in the manner described earlier. If a head and neck of the subject is not detected in the image, then the method ends. On the other hand, if a head and neck of the subject is detected in the image, then the method moves to block 406 of FIG. 4. At block 406 of FIG. 4, a convex hull for the detected head is constructed. As described in detail above with respect to FIG. 2, the convex hull is computed with a predefined (or minimum) threshold to determine a background to skin transition. For example, components (namely, pixels in a two-dimensional image embodiment or voxels in a three-dimensional image embodiment) are determined to be background components if their values are below the predefined threshold and are determined to be part of the head or neck if their values are above the predefined threshold. A convex hull is thus constructed to comprise the locations of components with values above the predefined threshold.

After constructing the convex hull at block 406 of FIG. 4, a centroid of the convex hull is determined at block 408, as described earlier with reference to FIG. 2. At block 410 of FIG. 2, a location of one or more facial features of the subject is identified in the image. In other words, the method described earlier with respect to block 204 of FIG. 2 is performed, which will not be repeated here, but it will be understood that the location of the one or more facial features of the subject can be identified in the image in the manner described earlier. In the example embodiment of FIG. 4, the one or more features for which the location is identified are the eyes of the subject. Thus, at block 410 of FIG. 4, the locations of the eyes of the subject is identified in the image.

At block 412, the distance between the eyes (i.e. the distance between the left eye and the right eye) is identified and, at block 414, a region of the image to modify is determined based on the identified locations of the eyes. In other words, the method described earlier with respect to block 206 of FIG. 2 is performed, which will not be repeated here, but it will be understood that the region of the image to modify may be determined based on the location of one or more facial features (which, in this example embodiment, is the locations of the eyes) in the manner described earlier. More specifically, in the example embodiment of FIG. 4, the region to be modified is set based on a distance between the identified locations of the eyes multiplied by a value of a predefined ratio, namely the golden ratio. Thus, in effect, the golden ratio is used as a multiplier.

At block 416 of FIG. 4, the tilt of the face (or the facial tilt) of the subject is assumed, as described earlier. The determined region of the image to modify is then adjusted, in order to take into account (or compensate for) the facial tilt. For example, in some embodiments, the determined region of the image to modify is determined based on the distance between the eyes and by assuming that the face extends in a vertical direction from the centre of the eyes, by a length that is proportional to the separation of the eyes. If, however, the face is tilted, then it can no longer be assumed that the face extends vertically, rather the slope of the face must be taken into consideration. This is compensated for at block 416, using an appropriate trigonometric relationship.

At block 418 of FIG. 4, the surface of the skin is determined by ray casting from a perimeter of the convex hull to the centroid, as described earlier with reference to FIG. 2. Once an appropriate region of the skin is determined for modification, the image is modified within the determined region to obscure the one or more facial features. In other words, the method described earlier with respect to block 208 of FIG. 2 is performed, which will not be repeated here, but it will be understood that the image can be modified within the determined region in the manner described earlier. In particular, in the example embodiment of FIG. 4, the image is modified by outwardly extending a plurality of protrusions (or, more specifically, stalactite structures) from the part of the head of the subject that is within the determined region, in order to obscure the one or more facial features.

Also, according to the example embodiment of FIG. 4, the image is further modified at block 422 to further obscure the skin surface. More specifically, components (namely, pixels in the two-dimensional image embodiment or voxels in the three-dimensional image embodiment) that correspond to the outwardly extending protrusions (or stalactite structures) are modified to further obscure the skin surface. The modifications to the outwardly extending protrusions may, for example, comprise setting one or more of the outwardly extending protrusions to different grayscale values grey scale or randomising skin-tone values of the one or more of the outwardly extending protrusions.

At block 424 of FIG. 4, the modified image is stored. For example, in this example embodiment, the modified image is saved to a file as an updated DICOM image using a DICOM writer. DICOM writers will be familiar to a person skilled in the art.

In this way, the image is modified as shown in FIG. 3, to obscure identifiable facial features of the subject in the image and the resulting image can be distributed for research, archiving or other purposes, without the identity of the subject being derivable from the image.

Figure 5:
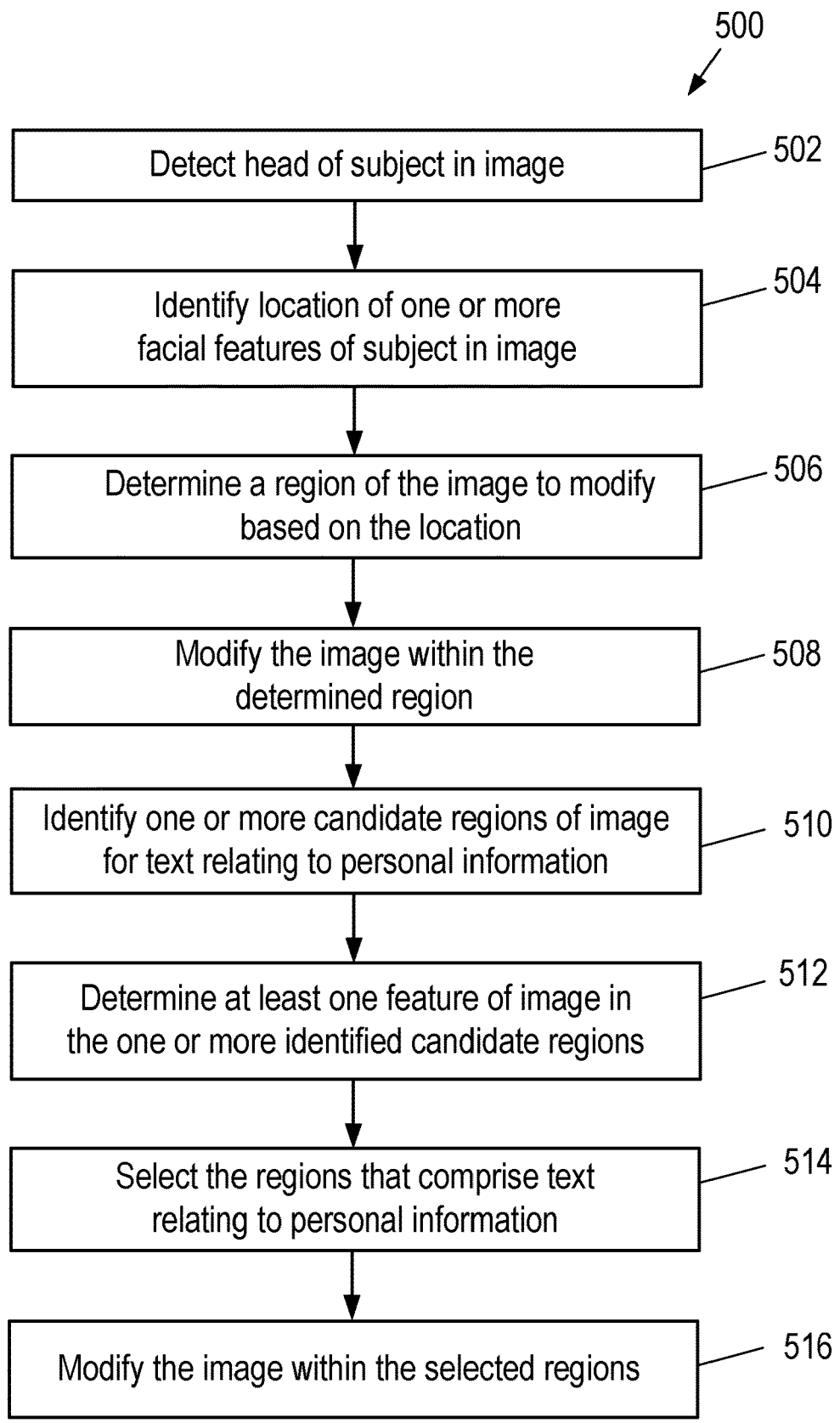
FIG. 5 illustrates a method for obscuring one or more facial features of a subject in an image according to another embodiment.

FIG. 5 illustrates a computer-implemented method 500 for obscuring one or more facial features of a subject in an image according to another embodiment. The illustrated method 500 can generally be performed by or under the control of the processor 102 of the apparatus 100.

With reference to FIG. 5, at blocks 502, 504, 506 and 508, the method according to blocks 202, 204, 206 and 208 respectively is performed, which will not be repeated here but the description in respect of FIG. 2 will be understood to apply. In addition to obscuring facial features as described earlier with reference to Figure, the method illustrated in FIG. 5 also obscures text that is embedded in the image.

Briefly, with reference to FIG. 5, embedded text can be obscured by identifying one or more candidate regions of the image for text relating to personal information of the subject (at block 510 of FIG. 5), determining at least one feature of the image in the one or more identified candidate regions of the image (at block 512 of FIG. 5), selecting, from the candidate regions, the regions that comprise text relating to personal information of the subject based on the at least one determined feature of the image in the one or more identified candidate regions of the image (at block 514 of FIG. 5) and modifying the image within the selected regions to obscure the text relating to personal information of the subject (at block 516 of FIG. 5). In any of the embodiments disclosed herein, the text relating to personal information of the subject can, for example, comprise Protected Health Information (PHI).

In more detail, at block 510 of FIG. 5, one or more candidate regions of the image for text relating to personal information of the subject are identified. The one or more candidate regions may, for example, be regions of the image where text is more likely to be found. For example, the one or more candidate regions may comprise one or more regions around the edge of image (i.e. one or more edge regions of the image).

In some embodiments, a connected component analysis may be used to identify one or more candidate regions of the image for text relating to personal information of the subject. For example, one or more regions in the image comprising connected components with the same value may be detected and those regions having a size that is greater than a predefined size may be identified as background regions, rather than text regions, and the remaining regions may be identified as candidate regions for text relating to personal information of the subject. It will be understood that connected components are those components in the image with the same value, which are connected to each other. Thus, for example, connected components in a two-dimensional image are clusters of pixels with the same value, which are connected to each other along any face or corner, and connected components in a three-dimensional image are clusters of voxels with the same value, which are connected to each other along any faces, edge, or corners.

In some embodiments, the connected component analysis may comprise grouping components in the image (namely, pixels in a two-dimensional image or voxels in a three-dimensional image) according to their intensity values. This can be based on the assumption that connected components with the same or similar intensity values will relate to the same object (or, in this case, the same letter or portion of text). Thus, in some embodiments, one or more groups of connected components with the same or similar intensity values may be identified as one or more candidate regions of the image for text relating to personal information of the subject. In some embodiments, one or more groups of connected components with intensity values within a predetermined range of intensity values (for example, between a first predetermined intensity value and a second predetermined intensity value) may be identified as one or more candidate regions of the image for text relating to personal information of the subject. It will be understood that the range of intensity values (or the first predetermined intensity value and the second predetermined intensity value) may be set based on intensity values that are expected for connected components that contain text and/or based on the relative intensity values of connected components containing text compared to the intensity values of connected components containing no text (or comprising background or other image data).

In this way, one or more candidate regions of the image for text relating to personal information of the subject can be identified. Although examples have been provided for connected component analysis, the person skilled in the art will be aware of various other connected component analysis techniques that can be used to identify one or more candidate regions.

Then, at block 512 of FIG. 5, at least one feature of the image is determined in the one or more identified candidate regions of the image. In some embodiments, at least one feature may relate to one or more (for example, geometric) properties associated with the components (namely, the pixels in a two-dimensional image embodiment or the voxels in a three-dimensional image embodiment) in the one or more candidate regions. In some embodiments, at least one feature may relate to one or more (for example, geometric) properties that can be used to distinguish between different components of text, such as letters, characters, numbers, or any other component of text, or any combinations of components of text. Thus, at block 512 of FIG. 5, component information (such as surface pixel or surface voxel) information can be extracted from the one or more identified candidate regions of the image.

Examples of the at least one feature include, but are not limited to, any one or combination of more than one of (i.e. any one or any combination of) a convex hull for a set of components in the one or more identified candidate regions of the image, a ratio of the number of components in the one or more identified candidate regions comprising text to the number of components in the entire image (or the extent of components comprising text), a geometric eccentricity of the image in the one or more identified candidate regions (for example, a ratio of a distance between a foci of an ellipse of the image in the one or more candidate regions to a major axis length of the image in the one or more candidate regions), a solidity of the components in the image in the one or more identified candidate regions (for example, where the solidity is a scalar value specifying the proportion of the components in the convex hull that are also in the one or more candidate regions), and an intensity of the image in the one or more identified candidate regions. It will be understood that a convex hull may be determined in the manner described earlier with respect to block 204 of FIG. 2 or using any other appropriate technique for determining a convex hull.

Returning back to FIG. 5, at block 514, the regions that comprise text relating to personal information of the subject are selected from the one or more identified candidate regions, based on the at least one determined feature of the image in the one or more identified candidate regions of the image. In some embodiments, the selection of the regions can comprise comparing the at least one determined feature to one or more stored features that are indicative of a region comprising text relating to personal information and selecting, from the one or more identified candidate regions, the regions that comprise text relating to personal information of the subject based on the comparison. In some embodiments, comparing the at least one determined feature to one or more stored features that are indicative of a region comprising text can comprise using machine learning to predict which candidate regions contain text relating to personal information of the subject, based on at least one feature of the image derived for each candidate region. In embodiments where machine learning is used, the machine learning can be performed using a set of training data comprising stored features that indicate the presence of text relating to personal information.

In embodiments where at least one feature of connected components of the image is determined in the one or more identified candidate regions of the image, the regions that comprise text relating to personal information of the subject may be selected from the candidate regions based on the at least one determined feature of the connected components of the image in the one or more identified candidate regions of the image.

Thus, in the manner described above, regions that comprise text relating to personal information of the subject are selected from the one or more identified candidate regions. Then, at block 516 of FIG. 5, the image is modified within the selected regions to obscure the text relating to personal information of the subject. In some embodiments, the image may be modified by applying an opaque mask or blackening out the image within the selected regions to obscure the text relating to personal information of the subject. For example, the text relating to personal information of the subject may be obscured by setting the intensities of the components in the selected regions to a single value.

In any of the embodiments described herein that involve obscuring text relating to personal information of the subject, although not illustrated, the method may further comprise performing text recognition within the selected regions to identify a (more exact) location of the text relating to personal information of the subject within the selected regions. More specifically, optical character recognition (OCR) libraries may be used to recognise text characters that match text relating to personal information to locate the text relating to personal information of the subject within the selected regions. In these embodiments, the image may be modified by modifying the image within the selected regions at the identified location to obscure the text relating to personal information of the subject.

Figure 6:
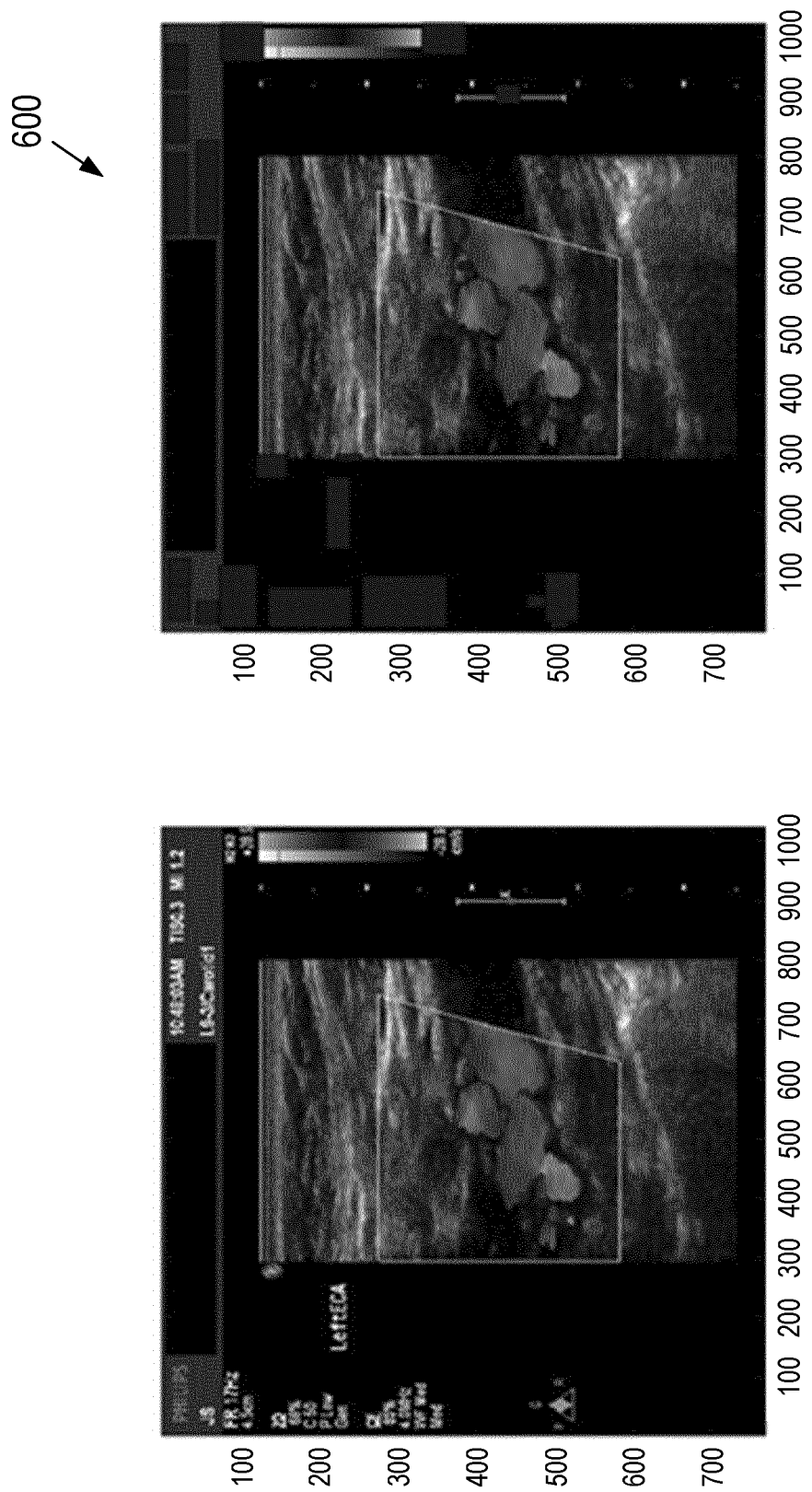
FIG. 6 illustrates an image modified according to another embodiment.

FIG. 6 illustrates an example of an original image 600 (on the left) and the same image 600 (on the right) modified in the manner described above with reference to FIG. 5. As shown in FIG. 6, the image 600 is modified within the selected regions to obscure the text relating to personal information of the subject. In this way, both identifiable facial features and embedded text can be obscured in an image.

Figure 7:
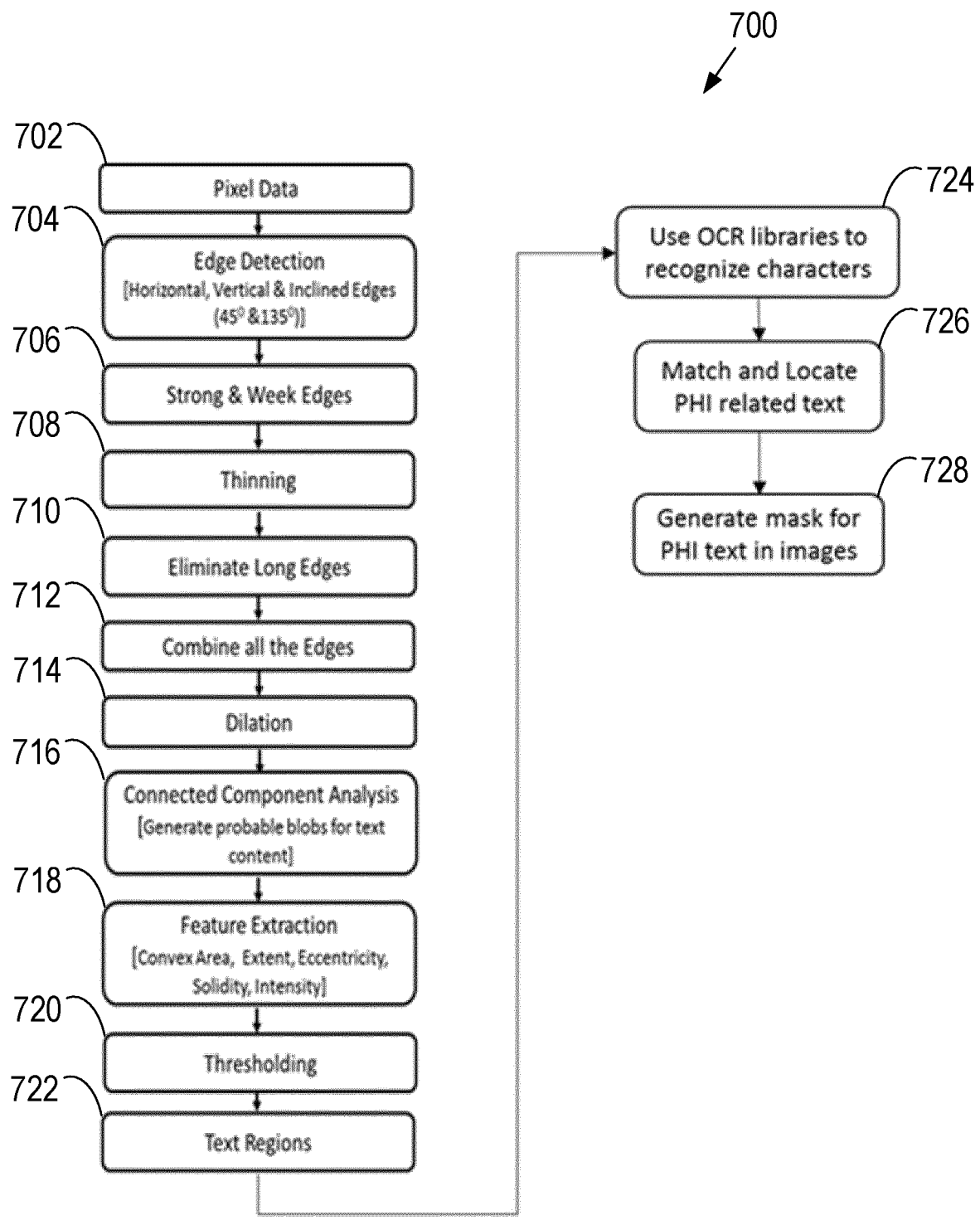
FIG. 7 illustrates a method for obscuring one or more facial features of a subject and text relating to personal information of the subject in an image according to an example embodiment.

FIG. 7 illustrates a computer-implemented method 700 for obscuring one or more facial features of a subject and text relating to personal information of the subject in an image according to an example embodiment. The illustrated method 700 can generally be performed by or under the control of the processor 102 of the apparatus 100.

At block 702 of FIG. 7, component data is acquired from the image or, in this example embodiment, pixel data is acquired from the image. Then, at blocks 704 to 714 of FIG. 7, a series of morphological operations may be performed on horizontal, vertical and inclined edges of the image to remove large components belonging to the background in the image.

At block 716 of FIG. 7, a connected component analysis is performed on the image to identify one or more candidate regions of the image for text relating to personal information of the subject. In other words, the method described earlier with respect to block 510 of FIG. 5 is performed, which will not be repeated here, but it will be understood that the connected component analysis can be performed in the manner described earlier. Once one or more candidate regions have been identified, then at block 718 of FIG. 7, at least one feature of the image is determined in the one or more identified candidate regions of the image. In other words, the method described earlier with respect to block 512 of FIG. 5 is performed, which will not be repeated here, but it will be understood that at least one feature of the image may be determined in the one or more identified candidate regions of the image in the manner described earlier. The at least one feature may include any one or more (i.e. any single one or combination) of the features mentioned earlier with respect to block 512 of FIG. 5.

At block 718 of FIG. 7, the at least one feature that is determined is extracted from the one or more candidate regions. At block 720 of FIG. 7, optimal thresholds are learnt by a learning algorithm, using a set of training, to identify candidate regions that contain real text. In this way, false positive candidate regions (i.e. regions not corresponding to text) in the image area can be removed.

At block 722 of FIG. 7, the regions that comprise text relating to personal information of the subject are selected from the one or more identified candidate regions, based on the at least one determined feature of the image in the one or more identified candidate regions of the image. In other words, the method described earlier with respect to block 514 of FIG. 5 is performed, which will not be repeated here, but it will be understood that the regions that comprise text relating to personal information of the subject can be selected in the manner described earlier.

At block 724 of FIG. 7, text recognition is performed within the selected regions to identify a (more exact) location of the text relating to personal information of the subject within the selected regions. More specifically, optical character recognition (OCR) libraries are used to recognise text characters. Then, at block 726, protected health information (PHI) related text is located from the results of an OCR scan of the selected regions to locate text in these regions that matches PHI text stored in the OCR libraries. Then, at block 728 of FIG. 7, a mask is generated for the PHI text and the image is modified by applying the mask to the selected regions at the identified location, thereby obscuring the text relating to personal information of the subject, as described earlier with respect to block 516 of FIG. 5.

Figure 8:
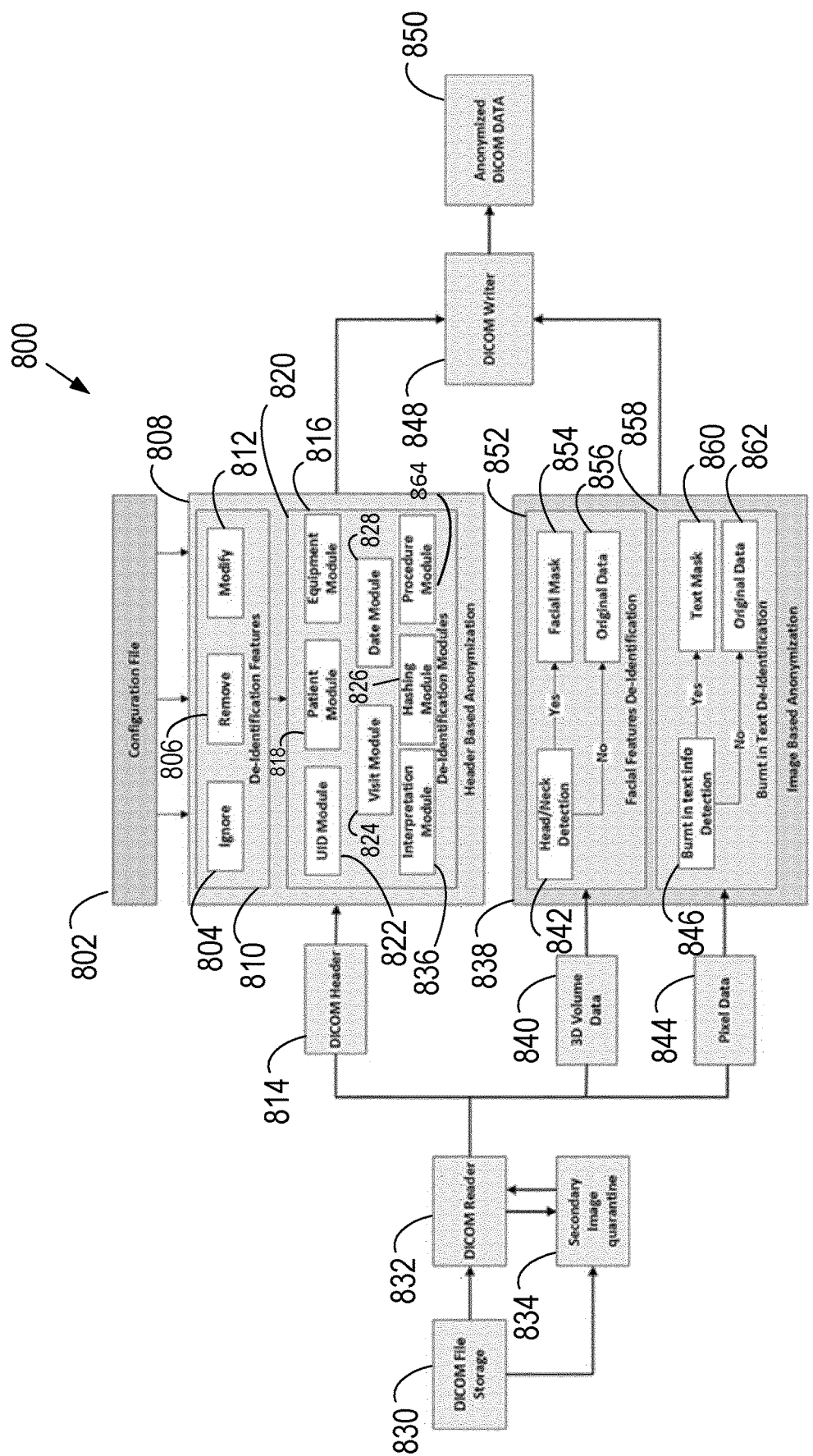
FIG. 8 is a block diagram of an apparatus for obscuring facial features of a subject in an image according to an example embodiment.

FIG. 8 shows a block diagram of an apparatus 800 according to an example embodiment that can be used for anonymising protected health information in a medical image in the manner described herein. The apparatus 800 in this example embodiment is a Digital Imaging and Communication in Medicine (DICOM) analyser. The DICOM analyser can support three types of de-identification process, namely header tags de-identification, embedded text de-identification and facial mask de-identification. This avoids repetitive efforts in performing all three types of de-identifications. The de-identification processes can be selectable by a user. Alternatively, the de-identification processes can be automated and can run without human intervention.

The apparatus comprises a DICOM file storage 830 configured to store DICOM files comprising images, a quarantine 834 configured to quarantine secondary images (e.g. DICOM image objects that do not come from the imaging equipment, but are created by technicians with the use of post processing applications), and a DICOM reader 832 configured to read images of the DICOM files (for example, where the images are not secondary images). Once a DICOM file comprising an image has been read by the DICOM reader, the DICOM header 814 is sent to a header based anonymization module 808, which removes information from the header of the DICOM image.

The header based anonymization module 808 comprises at least one de-identification module 820 comprising a plurality of sub-modules. The sub-modules for de-identification include a user identifiable information (UID) module 822 configured to remove UID information, a patient module 818 configured to de-identify patient specific information (such as name, age, date, time, address etc), an equipment module 816 configured to de-identify vendor specific information related to the model or to the make of the equipment used to take the image, a visit module 824 configured to de-identify date information related to longitudinal data associated with the patient visits, a hashing module 826 configured to add hash codes and replace identifier information in a DICOM header, a date module 828 configured to de-identify the date by shifting date and time information in a DICOM header, an interpretation module 836 configured to interpret pixel data related tags in a DICOM header and a procedure module 864 configured to de-identify tags related to the procedure performed on the patient. These de-identification modules are used to remove from the image header personal information that may identify a subject using header modification methods, thereby de-identifying the subject. The person skilled in the art will be aware of suitable header modification methods that may be used. The parameters for use by the de-identification modules are stored in a configuration file 802 and a de-identification features module 810 comprises tags with corresponding actions to ignore 804, remove 806, or modify 812 features in the image.

Three-dimensional (3D) volume data (or voxel data) 840 from the image is sent to a facial-features de-identification module 852 of an image based anonymization unit 838 whereby, as described earlier with respect to FIGS. 2 and 4, facial features are removed from the image using a head/neck detection module 842 and a facial mask module 854. In the event that no head or neck is detected in the image, the original data 856 is retained. Pixel data 844 from the image is sent to a burnt-in text de-identification module 858 of an image based anonymization unit 838, where burnt-in (i.e. embedded) text is detected at module 846, as described earlier with respect to FIGS. 5 and 7. If text relating to personal information of the subject is detected, text mask module 860 modifies the image to mask the region of the image comprising the text relating to personal information of the subject, as described earlier with reference to FIGS. 5 and 7. Otherwise, the original data 862 is retained.

It will be understood that the processor 102 of the apparatus 100 of FIG. 1 may comprise the facial-features de-identification module 852, the burnt-in text de-identification module 858, or the image based anonymization unit 838 that comprises both the facial-features de-identification module 852 and the burnt-in text de-identification module 858.

The modified image produced by the image based anonymization unit 838 of the apparatus 800 is output to a DICOM writer 848, which outputs the anonymised DICOM image 850. In this way, the apparatus 800 produces fully anonymised images by removing protected health information from the DICOM header and by obscuring facial features and embedded text relating to personal information of the subject.

There is therefore provided an improved method and apparatus for obscuring one or more facial features of a subject in an image. In accordance with the aspects and embodiments described herein, it is possible to prevent recognition of the subject and protect private information.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for obscuring two or more facial features of a subject in an image, the method comprising:
   detecting a head of the subject in the image;
   identifying a location of two or more facial features of the subject in the image;
   determining a region of the image to modify based on the location of the two or more facial features and based on a distance between the locations of at least two facial features multiplied by a value of a predefined ratio, wherein the determined region comprises a part of the head on which the two or more facial features are located; and
   modifying the image within the determined region to obscure the two or more facial features.

2. A method as claimed in claim 1, wherein identifying comprises:
   detecting a skin surface of the head of the subject in the image; and
   identifying a location of the two or more facial features on the detected skin surface of the head of the subject in the image.

3. A method as in claimed in claim 2, wherein detecting the skin surface of the head of the subject in the image comprises:
   determining a convex hull for the head of the subject in the image;
   for one or more points on a surface of the convex hull, tracing a path inwardly towards the centre of the head of the subject in the image; and
   detecting the skin surface of the head of the subject where a component of the image having a value greater than a background level for the image is detected.

4. A method as claimed in claim 1, wherein the predefined ratio defines a relationship of the distance between the locations of the at least two facial features to a distance between the locations of the at least two facial features and the locations of the at least one or more other features.

5. A method as claimed in claim 1, the method further comprising:
   adjusting the region of the image to modify based on a tilt of the head of the subject in the image.

6. A method as claimed in claim 1, wherein the image is modified by outwardly extending a plurality of protrusions from the part of the head that is within the determined region of the image to obscure the two or more facial features.

7. A method as claimed in claim 6, wherein the image is further modified by setting one or more of the outwardly extending protrusions to different grayscale values.

8. A computer program product comprising a non-transitory computer readable medium, the computer readable medium having computer readable code embodied therein, the computer readable code being configured such that, on execution by a suitable computer or processor, the computer or processor is caused to perform the method as claimed in claim 1.

9. An apparatus comprising a processor, wherein the processor is configured to perform the method as claimed in claim 1.

10. A computer-implemented method for obscuring one or more facial features of a subject in an image, the method comprising:
    detecting a head of the subject in the image;
    identifying a location of one or more facial features of the subject in the image;
    determining a region of the image to modify based on the location of the one or more facial features, wherein the determined region comprises a part of the head on which the one or more facial features are located; and
    modifying the image within the determined region to obscure the one or more facial features;
    identifying one or more candidate regions of the image for text relating to personal information of the subject;
    determining at least one feature of the image in the one or more identified candidate regions of the image;
    selecting, from the candidate regions, the regions that comprise text relating to personal information of the subject based on the at least one determined feature of the image in the one or more identified candidate regions of the image; and
    modifying the image within the selected regions to obscure the text relating to personal information of the subject.

11. A method as claimed in claim 10, wherein the at least one feature comprises any one or more of:
    a convex hull for a set of components in the one or more identified candidate regions of the image;
    a ratio of the number of components in the one or more identified candidate regions comprising text to the number of components in the entire image;
    a geometric eccentricity of the image in the one or more identified candidate regions;
    a solidity of the components in the image in the one or more identified candidate regions; and
    an intensity of the image in the one or more identified candidate regions.

12. A method as claimed in claim 10, wherein identifying one or more candidate regions comprises:
    detecting one or more regions in the image comprising connected components with the same value; and
    identifying the regions having a size greater than a predefined size as background regions and the remaining regions as candidate regions for text relating to personal information of the subject.

13. A method as claimed in claim 10, wherein selecting comprises:
    comparing the at least one determined feature to one or more stored features that are indicative of a region comprising text relating to personal information; and
    selecting, from the candidate regions, the regions that comprise text relating to personal information of the subject based on the comparison.

14. A method as claimed in claim 10, wherein the method comprises:

performing text recognition within the selected regions to identify a location of the text relating to personal information of the subject within the selected regions; and wherein modifying the image comprises:

modifying the image within the selected regions at the identified location to obscure the text relating to personal information of the subject.

15. A computer-implemented apparatus comprising at least one processor programmed to obscure two or more facial features of a subject in an image, the method comprising:

detecting a head of the subject in the image;

identifying a location of two or more facial features of the subject in the image;

determining a region of the image to modify based on the location of the two or more facial features and based on a distance between the locations of at least two facial features multiplied by a value of a predefined ratio, wherein the determined region comprises a part of the head on which the two or more facial features are located; and modifying the image within the determined region to obscure the two or more facial features.

16. An apparatus as in claimed in claim 15, wherein identifying comprises:

detecting a skin surface of the head of the subject in the image by:

determining a convex hull for the head of the subject in the image;

for one or more points on a surface of the convex hull, tracing a path inwardly towards the centre of the head of the subject in the image; and detecting the skin surface of the head of the subject where a component of the image having a value greater than a background level for the image is detected; and identifying a location of the two or more facial features on the detected skin surface of the head of the subject in the image.

17. An apparatus as claimed in claim 15, wherein the processor is further programmed to obscure the two or more facial features of a subject in the image:

identifying one or more candidate regions of the image for text relating to personal information of the subject;

determining at least one feature of the image in the one or more identified candidate regions of the image;

selecting, from the candidate regions, the regions that comprise text relating to personal information of the subject based on the at least one determined feature of the image in the one or more identified candidate regions of the image; and modifying the image within the selected regions to obscure the text relating to personal information of the subject.

18. An apparatus as claimed in claim 17, wherein the at least one feature comprises any one or more of:

a convex hull for a set of components in the one or more identified candidate regions of the image;

a ratio of the number of components in the one or more identified candidate regions comprising text to the number of components in the entire image;

a geometric eccentricity of the image in the one or more identified candidate regions;

a solidity of the components in the image in the one or more identified candidate regions; and an intensity of the image in the one or more identified candidate regions.

19. An apparatus as claimed in claim 17, wherein identifying one or more candidate regions comprises:

detecting one or more regions in the image comprising connected components with the same value; and identifying the regions having a size greater than a predefined size as background regions and the remaining regions as candidate regions for text relating to personal information of the subject.

20. An apparatus as claimed in claim 17, wherein selecting comprises:

comparing the at least one determined feature to one or more stored features that are indicative of a region comprising text relating to personal information; and selecting, from the candidate regions, the regions that comprise text relating to personal information of the subject based on the comparison.

* * * * *